(12) United States Patent
Hiale-Guilhamou et al.

(10) Patent No.: US 10,170,009 B2
(45) Date of Patent: Jan. 1, 2019

(54) METHOD FOR TRANSMITTING FLIGHT PARAMETERS OF A LEAD AIRCRAFT TO AN INTRUDER AIRCRAFT

(71) Applicant: Airbus Operations (S.A.S.), Toulouse (FR)

(72) Inventors: Mathieu Hiale-Guilhamou, Grenade (FR); Jean-luc Robin, Saint-Jean (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 15/950,111

(22) Filed: Apr. 10, 2018

(65) Prior Publication Data

US 2018/0301044 A1    Oct. 18, 2018

(30) Foreign Application Priority Data

Apr. 11, 2017    (FR) .................................. 17 53139

(51) Int. Cl.
*G08G 5/04*    (2006.01)
*G08G 5/00*    (2006.01)

(52) U.S. Cl.
CPC ........... *G08G 5/045* (2013.01); *G08G 5/0008* (2013.01); *G08G 5/0078* (2013.01)

(58) Field of Classification Search
CPC combination set(s) only.
See application file for complete search history.

(56) References Cited

U.S. PATENT DOCUMENTS

| 6,683,541 | B2 * | 1/2004 | Staggs | G01C 23/00 340/961 |
| 6,703,945 | B2 * | 3/2004 | Kuntman | G01C 23/00 340/949 |
| 6,963,291 | B2 * | 11/2005 | Holforty | B64D 43/00 340/945 |

(Continued)

FOREIGN PATENT DOCUMENTS

| EP | 2851889 A2 | 3/2015 |
| WO | WO 2004/029902 A1 | 4/2004 |

OTHER PUBLICATIONS

French Search Report for Application No. 1753139 dated Oct. 24, 2017.

*Primary Examiner* — Travis R Hunnings
(74) *Attorney, Agent, or Firm* — Jenkins, Wilson, Taylor & Hunt, P.A.

(57) ABSTRACT

A method for transmitting flight parameters of a lead aircraft to an intruder aircraft. Transmission includes a collision avoidance system connected to which is a flight parameter transmission authorization system having a database including coordinates defining a volume of confidence smaller than the monitoring volume. The flight parameter transmission authorization system of the lead aircraft authorizes, only for an intruder aircraft identified as flying within the volume of confidence, transmission of at least one flight parameter of the lead aircraft, such that this intruder aircraft is able to calculate the position of centers of wake vortices generated by the lead aircraft or the flow strength of the wake vortices. Exchanging flight parameters of the lead aircraft only with intruder aircraft flying within the volume of confidence with limited dimensions makes it possible not to exceed the maximum capacity of the bandwidth of the automated communication.

4 Claims, 7 Drawing Sheets

(56) References Cited

U.S. PATENT DOCUMENTS

| | | | | |
|---|---|---|---|---|
| 7,411,519 B1 * | 8/2008 | Kuntman | ............... | G01C 23/00 340/961 |
| 8,362,925 B2 * | 1/2013 | Brinkman | ............... | G01C 23/00 340/945 |
| 2002/0075171 A1 * | 6/2002 | Kuntman | ............... | G01C 23/00 340/961 |
| 2017/0301251 A1 * | 10/2017 | Robin | .................... | B64D 45/00 |
| 2017/0309192 A1 * | 10/2017 | Robin | .................. | G08G 5/0021 |

* cited by examiner

METHOD FOR TRANSMITTING FLIGHT PARAMETERS OF A LEAD AIRCRAFT TO AN INTRUDER AIRCRAFT

CROSS-REFERENCE TO RELATED APPLICATION

This patent application claims priority to French patent application FR 17 53139, filed on Apr. 11, 2017, the entire disclosure of which is incorporated by reference herein.

TECHNICAL FIELD

The disclosure herein relates to a method for transmitting flight parameters of an aircraft, termed lead aircraft, to at least one other aircraft, termed intruder aircraft, so that the intruder aircraft is/are able to precisely calculate the positions of the centers of wake vortices generated by the lead aircraft in its wake or else the flow strength of the wake vortices.

BACKGROUND

An aircraft in flight generates two wake vortices in its wake. Starting from the wings, the vortices tend first of all to move closer to one another, and then to maintain a more or less constant distance from one another while at the same time losing altitude with respect to the altitude at which they were generated.

The formation of wake vortices behind an aircraft is well known and documented, and the position of the centers of the vortices generated by an aircraft is acquired in particular by calculating their descent speed. This depends on flight parameters of the aircraft, such as mass, altitude, roll angle, aerodynamic configuration, size, air density at the flight point, speed, etc.

It is beneficial for an aircraft, termed intruder aircraft, to be able to precisely calculate the positions of the vortices generated in the wake by an aircraft, termed lead aircraft, in order:

to fly in formation behind the lead aircraft while drawing maximum benefit from the updraughts in the vortices in order to reduce its fuel consumption; or to avoid being subjected to turbulence caused by the vortices.

For an intruder aircraft flying in formation behind a lead aircraft, it is additionally beneficial to calculate the flow strength of the wake vortices generated by the lead aircraft, so as to position itself effectively in the updraughts of the vortices. The flow strength is also able to be calculated through knowledge of the flight parameters of the lead aircraft, such as mass, size, air density at the flight point, speed, etc.

In a known manner, aircraft that are close to one another communicate data between one another in an automated manner, in particular via an active collision avoidance device of TCAS (Traffic Collision Avoidance System) type. Such a system fitted on an aircraft is able to monitor up to forty-five other aircraft flying within a monitoring volume of the TCAS and, as a result, the bandwidth of the automated data communications between the aircraft has to be restricted such that only the altitude, necessary for predicting a risk of collision, is exchanged. As a result, on account of the bandwidth restriction, the flight parameters necessary for calculating the descent speed of the centers of the vortices generated by the lead aircraft or for calculating the flow strength of the wake vortices are not able to be transmitted to the intruder aircraft.

SUMMARY

One objective of the disclosure herein is to address this problem and to enable the automatic transmission (without human intervention) of flight parameters of a lead aircraft to an intruder aircraft, such that the intruder aircraft is able to calculate the positions of the centers of the wake vortices generated by the lead aircraft or the flow strength of the wake vortices.

To this end, the disclosure herein relates to a method for transmitting flight parameters of a lead aircraft to at least one intruder aircraft, each aircraft comprising:

a collision avoidance system configured to detect probabilities of collisions with other aircraft flying within a monitoring volume distributed around the aircraft, the system comprising an interrogator connected to a directional antenna, termed interrogator antenna, and a transponder;

a flight management system collecting the flight parameters of the aircraft; and a flight parameter transmission authorization system connected to the collision avoidance system, the flight parameter transmission authorization system having a database comprising coordinates defining a volume, termed volume of confidence, the volume of confidence being smaller than the monitoring volume of the aircraft;

the method comprising the following successive steps:

interrogation, in which the interrogator of the lead aircraft transmits an interrogation signal via the interrogator antenna in each of four segments of 90° azimuth, the interrogation signal containing an address of the lead aircraft;

reception, in which the interrogator of the lead aircraft receives, from the transponder of each intruder aircraft located within the monitoring volume, a response signal in response to an interrogation signal from the lead aircraft, the response signal comprising the altitude of the intruder aircraft provided by the flight management system of the intruder aircraft;

calculation, in which the interrogator of the lead aircraft determines the position of each intruder aircraft on the basis of the time difference between the transmission of the interrogation signal and the reception of a response signal from the intruder aircraft, of the analysis of a wave carrying the intruder response signal, and of the knowledge of the altitude of the intruder aircraft;

comparison and determination, on the basis of the database, of the position of each intruder aircraft with respect to the volume of confidence; and only if an intruder aircraft is situated within the volume of confidence, transmission, by the flight parameter transmission authorization system of the lead aircraft, of an instruction to the transponder of the lead aircraft to transmit a signal, termed enriched signal, to the interrogator of the intruder aircraft, the enriched signal comprising one or more flight parameters provided by the flight management system of the lead aircraft and enabling the flight management system of the intruder aircraft to calculate the position of centers of wake vortices generated by the lead aircraft or the flow strength of the wake vortices.

An idea underlying the disclosure herein is to create a limited volume of confidence, with dimensions smaller than the monitoring volume, in the wake of the lead aircraft, in which, by nature, only a limited number (2 at most) of intruder aircraft are able to be situated.

Exchanging flight parameters of the lead aircraft only with intruder aircraft flying within the volume of confidence with limited dimensions makes it possible not to exceed the maximum capacity of the bandwidth of the automated communication.

The disclosure herein relates furthermore to an aircraft for implementing the transmission method, the aircraft comprising:
- a collision avoidance system comprising an interrogator connected to a directional antenna, termed interrogator antenna, and a transponder, the collision avoidance system being configured to detect probabilities of collisions with other aircraft, termed intruder aircraft, flying within a monitoring volume distributed around the aircraft;
- a flight management system collecting the flight parameters of the aircraft; the aircraft comprising a flight parameter transmission authorization system connected to the collision avoidance system, the flight parameter transmission authorization system having a database comprising coordinates defining a volume, termed volume of confidence, the volume of confidence being smaller than the monitoring volume, and the flight management system being configured to calculate the position of centers of wake vortices generated by an intruder aircraft on the basis of flight parameters of the intruder aircraft or to calculate the flow strength of the wake vortices generated by the intruder aircraft.

BRIEF DESCRIPTION OF THE DRAWINGS

The features of the disclosure herein mentioned above, along with others, will become more clearly apparent on reading the following description of exemplary embodiments, the description being given with reference to the appended, example figures, in which.

DETAILED DESCRIPTION

Figure 1:
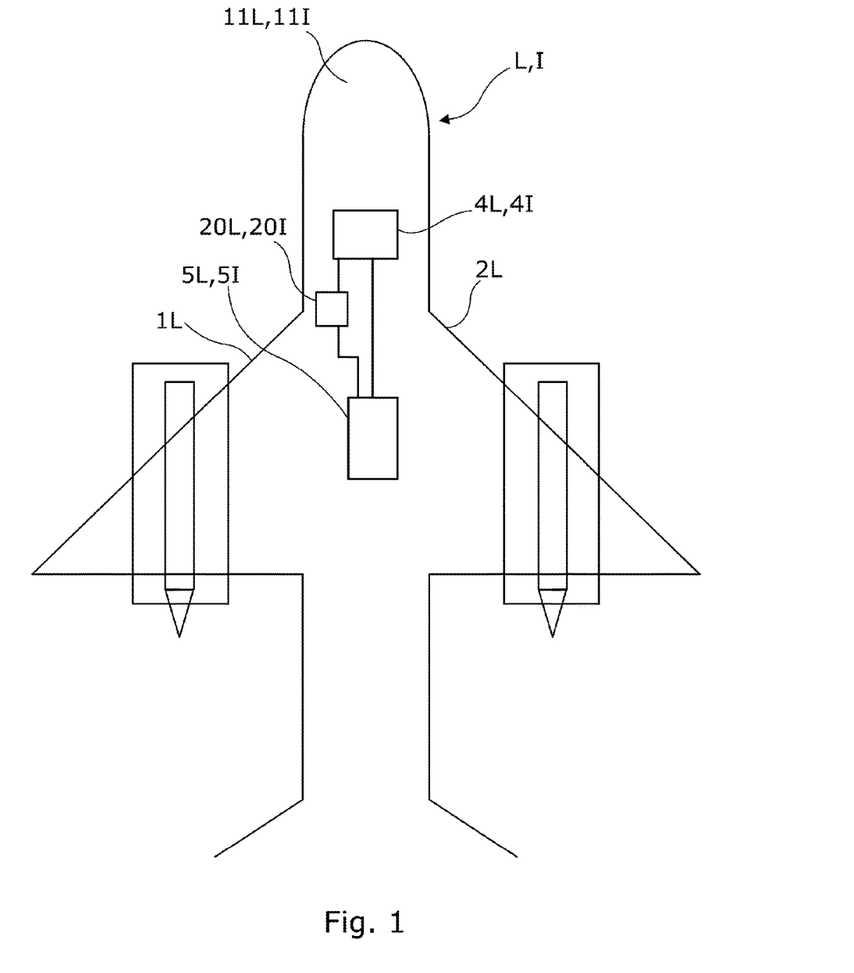
FIG. 1 is a schematic representation of an aircraft according to the disclosure herein comprising a plurality of on-board systems making it possible to implement a flight parameter transmission method according to the disclosure herein, namely a collision avoidance system, a flight management system and a data transmission authorization system.

With reference to FIG. 1, an aircraft L, I comprises two wings 1L, 2L and a plurality of on-board systems in its fuselage 11L, 11I, namely a flight management system 4L, 4I of FMS type and a collision avoidance system 5L, 5I connected to the flight management system 4L, 4I.

The flight management system 4L, 4I of FMS type compiles flight parameters of the aircraft; mass, altitude, roll angle, aerodynamic configuration, size, air density at the flight point, speed, etc.

According to the disclosure herein, the flight management system is capable of calculating the position of the center of wake vortices generated by another aircraft following reception of flight parameters of the other aircraft.

In particular, the position of the centers of the vortices generated by an aircraft is acquired by calculating the descent speed of the vortices, the altitude at which the vortices were generated and the speed and the size of the aircraft generating the vortices. The descent speed Wv is for example calculated using the following relationship:

$$w_v = \frac{m \cdot g \cdot n_z}{2 \cdot \pi \cdot \rho \cdot V \cdot b_v^2}$$

m the mass of the aircraft generating the vortices (kg)
g the acceleration due to gravity (9.81 m/s$^2$)
ρ the air density at the flight point (kg·m-3)
V the speed of the aircraft generating the vortices (m·s-1)
by the spacing between the 2 vortices (m)=size of the aircraft
generating the vortices
φ the roll angle of the aircraft generating the vortices (deg)
nz the load factor to which the aircraft generating the vortices is subjected.

In a known manner, the collision avoidance system 5L, 5I warns the crew of the lead aircraft of probabilities of collisions with other aircraft flying within a monitoring volume distributed around (over 360°) the aircraft and the dimensions of which depend on the speed of the aircraft L, I.

Figure 2:
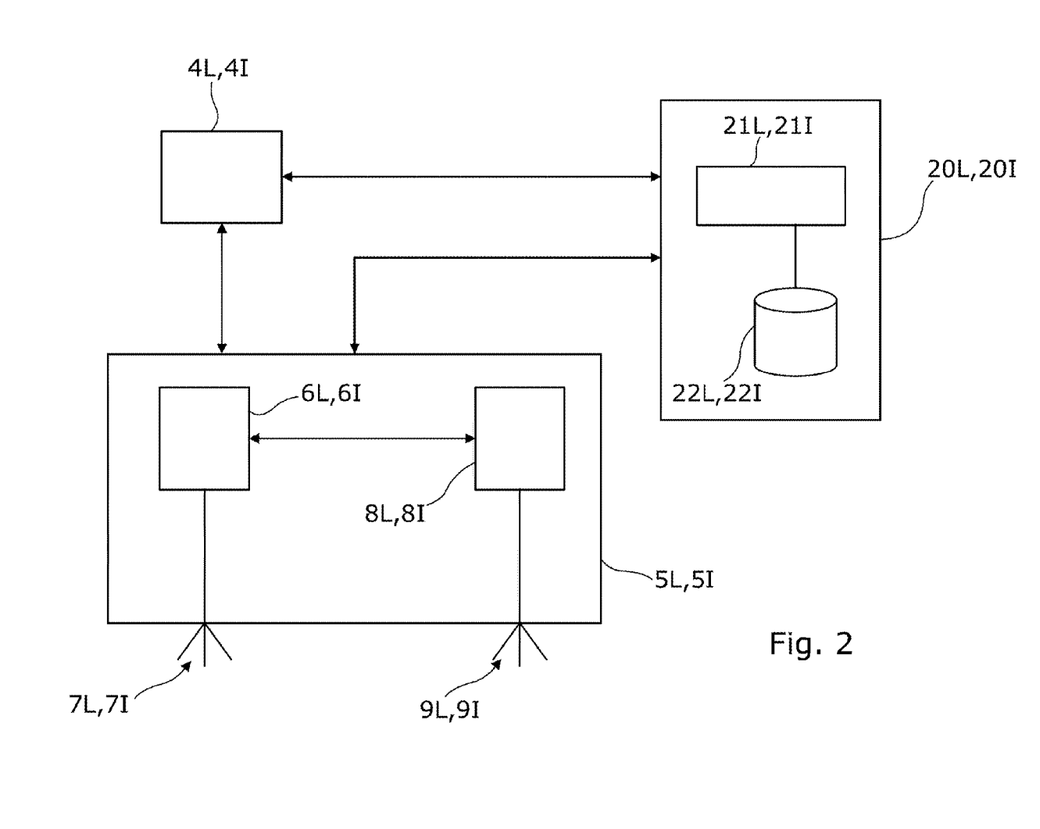
FIG. 2 is a schematic representation of a detail of the connections between the collision avoidance system, the flight management system and the data transmission authorization system of the aircraft of FIG. 1.

With reference to FIG. 2, the collision avoidance system is an active device of TCAS ("Traffic Collision Avoidance System") type and to this end comprises:
- an interrogator 6L, 6I, of central unit type, connected to at least one directional antenna 7L, 7I, termed interrogator antenna, mounted on the aircraft;
- a transponder 8L, 8I (or XPDR in aeronautical terminology), of central unit type, connected to at least one antenna 9L, 9I that is for example omnidirectional, termed transponder antenna, mounted on the aircraft;
- a conventional warning unit (not shown), of acoustic type and/or of visual type, positioned in the cockpit of the aircraft; and
- a display unit (not shown) positioned in the cockpit of the aircraft.

The dimensions of the monitoring volume are dependent on the waves transmitted by the interrogator at a predefined power and at predefined angles.

When two aircraft each equipped with a collision avoidance device of TCAS type converge towards one another, each collision avoidance device 5L, 5I of an aircraft determines the position of the other aircraft, termed intruder aircraft I, and estimates a collision time with the intruder aircraft I. The collision avoidance device 5L, 5I transmits a traffic warning informing the crew of a possible future collision, or transmits an avoidance manoeuvre command for the attention of the crew and of the flight management system 4L, 4I in order to take the aircraft out of the possibility of collision situation. The warnings/commands are embodied as voice messages emitted by the warning unit and as a display of information by the display unit.

According to the disclosure herein, the aircraft L, I furthermore comprises a flight parameter transmission authorization system 20L, 20I connected to the flight management system 4L, 4I and to the collision avoidance system 5L, 5I. The flight parameter transmission authorization system 20L,I is of central unit type and comprises, in a known manner, at least one processor 21L, 21I and memories (not shown). A database 22L, 22I is recorded in at least one of the memories.

The database 22L, 22I comprises coordinates, in a reference frame linked to the aircraft L, I, defining a volume, termed volume of confidence, situated behind the aircraft L, I and having dimensions smaller than those of the monitoring volume. The volume of confidence is, for example, fixed and extends over a length of 2 nautical miles (3.704 km) behind the aircraft, a height of 3200 feet (975.36 m) and a width of 9200 m. The extents of the width and the height are distributed equally about a median plane and the plane of the wings (that is to say the plane perpendicular to the median plane and that separates the fuselage of the aircraft into an upper part and a lower part), respectively, of the aircraft L, I. With such a definition of the volume of confidence, it is estimated that at most only 1 or 2 intruder aircraft are able to be located within the volume of confidence.

The memories also comprise instructions that are executed by the at least one processor 21L, 21I in order to determine whether the position, determined by the collision avoidance system, of an intruder aircraft I flying close to the aircraft L-I is situated within or outside of the volume of confidence.

Lastly, the memories comprise instructions that are executed by the at least one processor 21L, 21I in order, as long as the intruder aircraft is located within the volume of confidence, to authorize the transmission, to the intruder aircraft, of flight parameters that will enable the latter to calculate the position of the wake vortices generated by the aircraft L-I. More precisely, the flight parameters provided by the flight management system 4L, 4I are sent by way of a signal transmitted by the transponder 8L, 8I to the interrogator of the intruder aircraft I.

Figure 3:
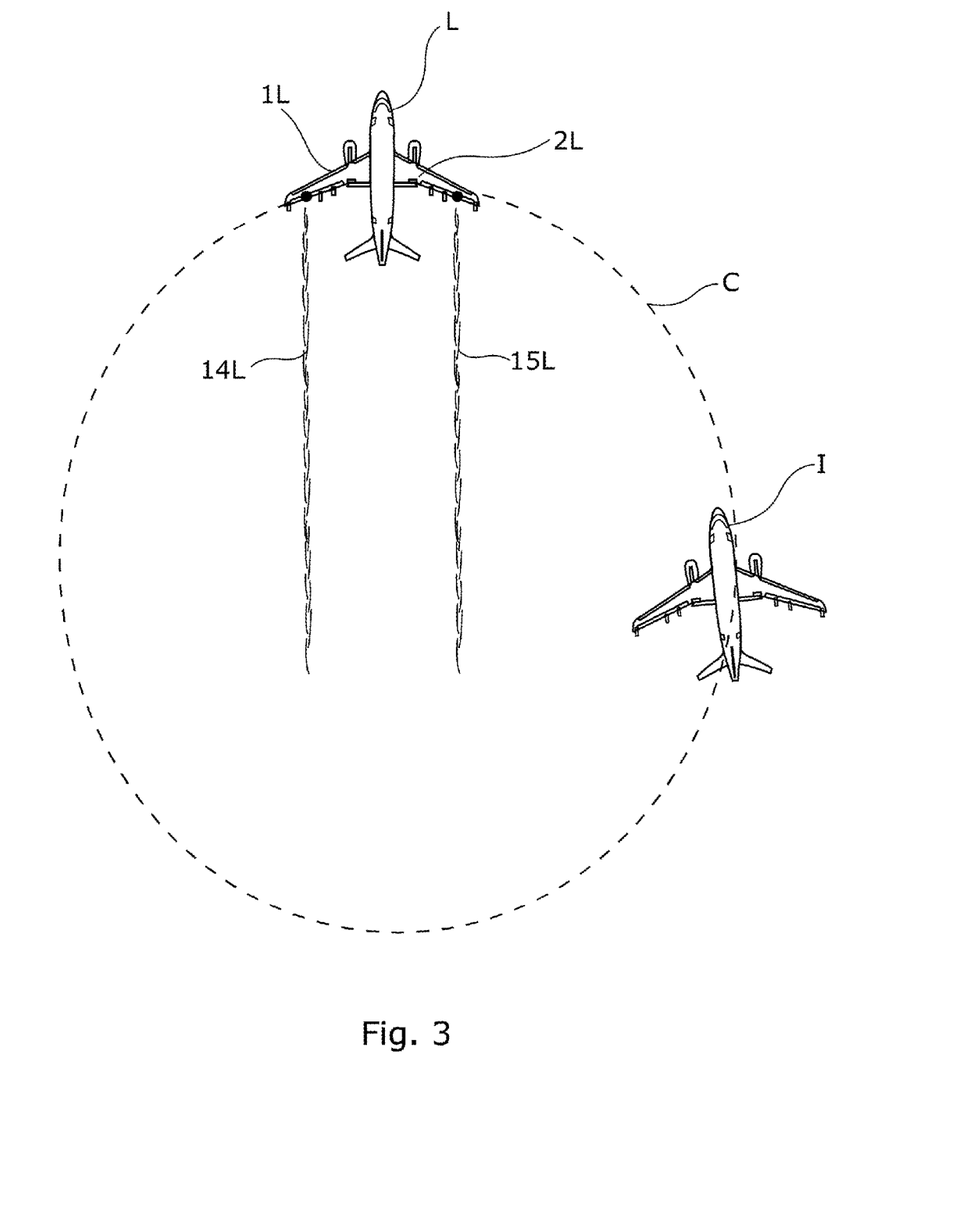
FIG. 3 is a schematic representation of a formation of two aircraft such as illustrated in FIG. 1, namely a lead aircraft generating wake vortices and an intruder aircraft flying in formation in the wake of the lead aircraft.
Figure 4:
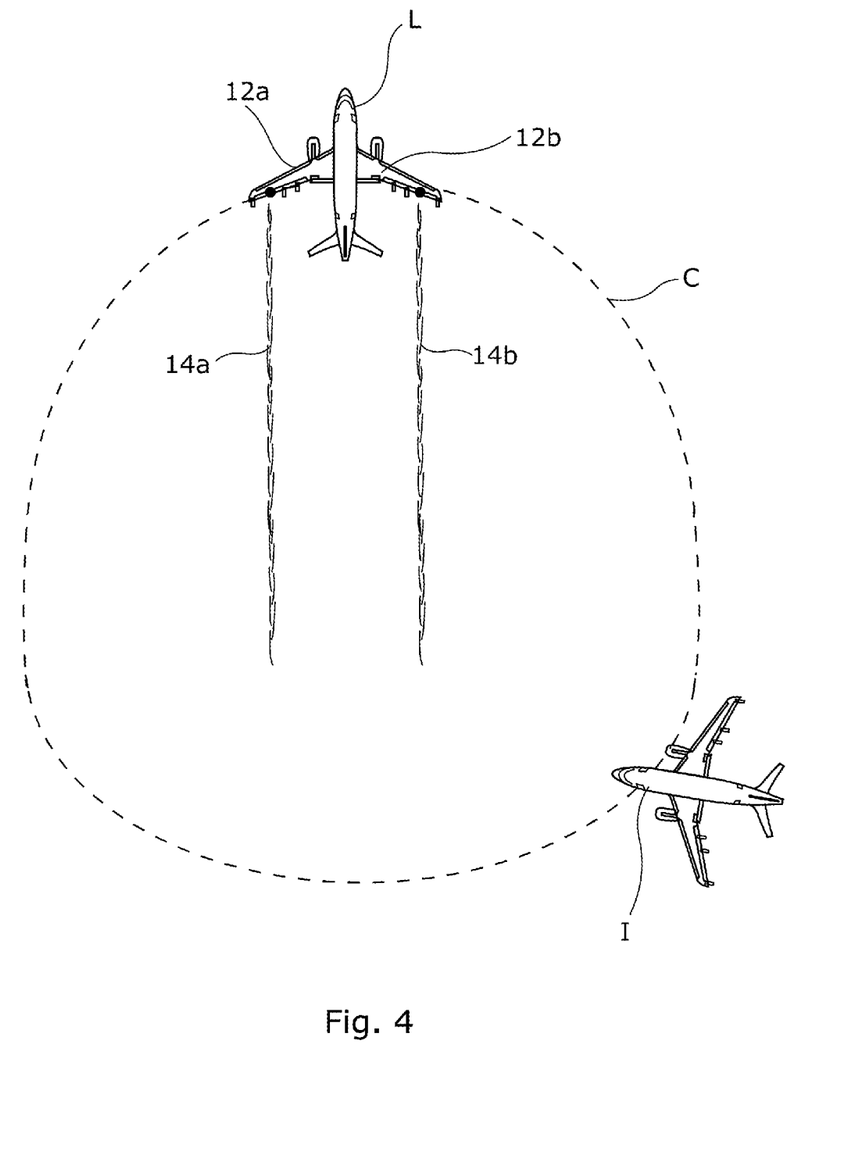
FIG. 4 is a view similar to FIG. 3, in which the intruder aircraft passes through the wake of the lead aircraft.
Figure 5:
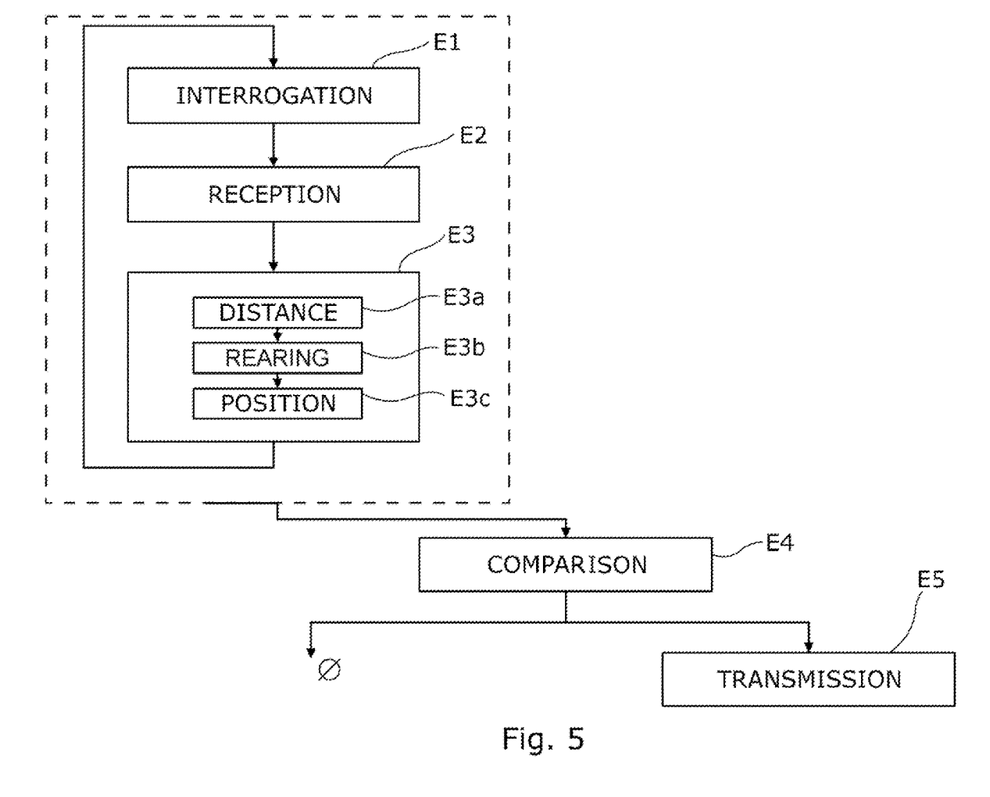
FIG. 5 is a schematic view of the steps of a flight parameter transmission method according to the disclosure herein between a lead aircraft and an intruder aircraft in the case of FIG. 3 or FIG. 4.

The method according to the disclosure herein will be elucidated with reference to FIGS. 3 through 5. Consideration is given to an aircraft L, termed lead aircraft, generating, at each of its two wings 1L, 2L, a wake vortex 14L, 15L (respectively port—starboard), and to a plurality of intruder aircraft I flying within the monitoring volume of the lead aircraft L.

A single intruder aircraft I is shown in FIGS. 3 and 4: an intruder aircraft I flying in formation behind the lead aircraft L in FIG. 3, or, in FIG. 4, an intruder aircraft I passing through the wake of the lead aircraft L with a course substantially perpendicular to that of the lead aircraft L.

Each of the aircraft, lead L or intruder I, is equipped such as described above with reference to FIGS. 1 and 2. The references bear the suffix L for the lead aircraft or I for the intruder aircraft.

According to the disclosure herein, the sequence of following steps is implemented in the lead aircraft L in a cyclic manner, for example every second.

in an interrogation step E1, the interrogator 6L of the lead aircraft interrogates the transponders 8I of the intruder aircraft I by sending, via the interrogator antenna 7L, interrogation signals on 1030 MHz in each of the four segments of 90° azimuth. An interrogation signal contains an address of the lead aircraft L;

in a reception step E2, each transponder 8I of an intruder aircraft receiving the interrogation signal from the lead aircraft L responds, on 1090 MHz, to the interrogation signal from the lead aircraft L by transmitting, via the transponder antenna 9I, a response signal to the address of the lead aircraft L. The response signal is received and processed by the interrogator 6L of the lead aircraft and consists of or comprises a series of pulses that contain identifiers of intruder aircraft I and information regarding the altitude of the intruder aircraft I;

in a calculation step E3, the interrogator 6L of the lead aircraft L determines the position, with respect to the lead aircraft L, of each intruder aircraft I that has responded to the interrogation signal. To this end, in a first sub-step E3a, on the basis of the time difference between the transmission of the interrogation signal and the reception of a response signal, the interrogator 6L calculates the distance between the lead aircraft L and the intruder aircraft I. In a second sub-step E3b, the interrogator 6L of the lead aircraft calculates the bearing of the intruder aircraft I through interferometry by analysing the wave carrying the response signal and received by the directional antenna 7L. In a third sub-step E3c, the interrogator 6L of the lead aircraft, with knowledge of the altitude, the bearing and the distance of each intruder aircraft I that has been interrogated and has responded, constructs a three-dimensional map of the position, in the reference frame of the lead aircraft L, of the intruder aircraft I that have responded to the interrogation signal. The interrogator 6L determines whether there is a collision threat and consequently reacts as described above, by transmitting traffic warnings or avoidance manoeuvre commands.

The sequence of interrogation, response and calculation steps (steps E1 to E3) takes place in a cyclic manner, for example several times a second. The speed of each intruder aircraft I is calculated between two cycles by the interrogator 6L of the lead aircraft.

It should be noted that the sequence of interrogation, reception and calculation steps is also implemented in each intruder aircraft I, also in a cyclic manner. During these steps, the transponder 8L of the lead aircraft L interrogated by an intruder aircraft I transmits, via its transponder antenna 9L, a response signal to the interrogator 6I of the intruder aircraft, the response signal comprising the altitude of the lead aircraft L.

Following a calculation step E3 of one cycle, the flight parameter transmission authorization system 20L of the lead aircraft, in a comparison and determination step E4, determines, on the basis of the database 22, whether the position of each intruder aircraft I calculated in the calculation step E3 is situated within the volume of confidence C.

If an intruder aircraft is situated within the volume of confidence, in a transmission step E5, the flight parameter transmission authorization system 20L of the lead aircraft transmits an instruction to the transponder 8L of the lead aircraft L to transmit a signal, termed enriched signal, to the interrogator 6I of the intruder aircraft.

The enriched signal contains one or more flight parameters, other than the altitude, provided by the flight management system 4L of the lead aircraft and that will enable the flight management system 4I of the intruder aircraft to precisely calculate the position of the centers of the vortices 14L, 15L generated by the lead aircraft L.

By contrast, if the intruder aircraft I is situated outside of the volume of confidence, the flight parameter transmission authorization system 20L does not transmit any instruction to the transponder 8L of the lead aircraft.

The comparison step E4 is implemented by the flight parameter transmission authorization system 20L of the lead aircraft upon each new cycle of the sequence of interrogation, response and calculation steps (steps E1 to E3). As a result, the flight parameters enabling calculation of the position of the centers of the wake vortices of the lead aircraft are only transmitted to an intruder aircraft I as long as the latter is situated within the volume of confidence C.

An idea underlying the disclosure herein is to create a limited volume of confidence, with dimensions smaller than the monitoring volume, in the wake of the lead aircraft, in which, by nature, only a limited number (2 at most) of intruder aircraft are able to be situated. It is thus possible to transmit flight parameters of the lead aircraft other than the altitude to a limited number of intruder aircraft identified as flying within the volume of confidence, without exceeding the capacity of the bandwidth of the communication.

With knowledge of these flight parameters, the flight management system 4L of the intruder aircraft I is able to precisely calculate the positions of the vortices 14a-b generated by the lead aircraft L in order:
- to fly in formation behind the lead aircraft L while drawing maximum benefit from the updraughts in the vortices in order to reduce its fuel consumption (the case of FIG. 3); or
- to avoid being subjected to turbulence caused by the vortices (the case of FIG. 4).

Advantageously, in order to further optimize the use of the bandwidth, the processor 21L of the flight parameter transmission authorization system 20L of the lead aircraft (calculating the speed of the intruder aircraft I calculated over two cycles E1-E3) determines the time remaining for an intruder aircraft I located within the volume of confidence C before leaving the volume of confidence C. If the time is shorter than a predetermined time (for example 5 seconds), the transmission step E5 is not implemented by the parameter transmission authorization system 20L even if the intruder aircraft I is still situated within the volume of confidence C.

Figure 6:
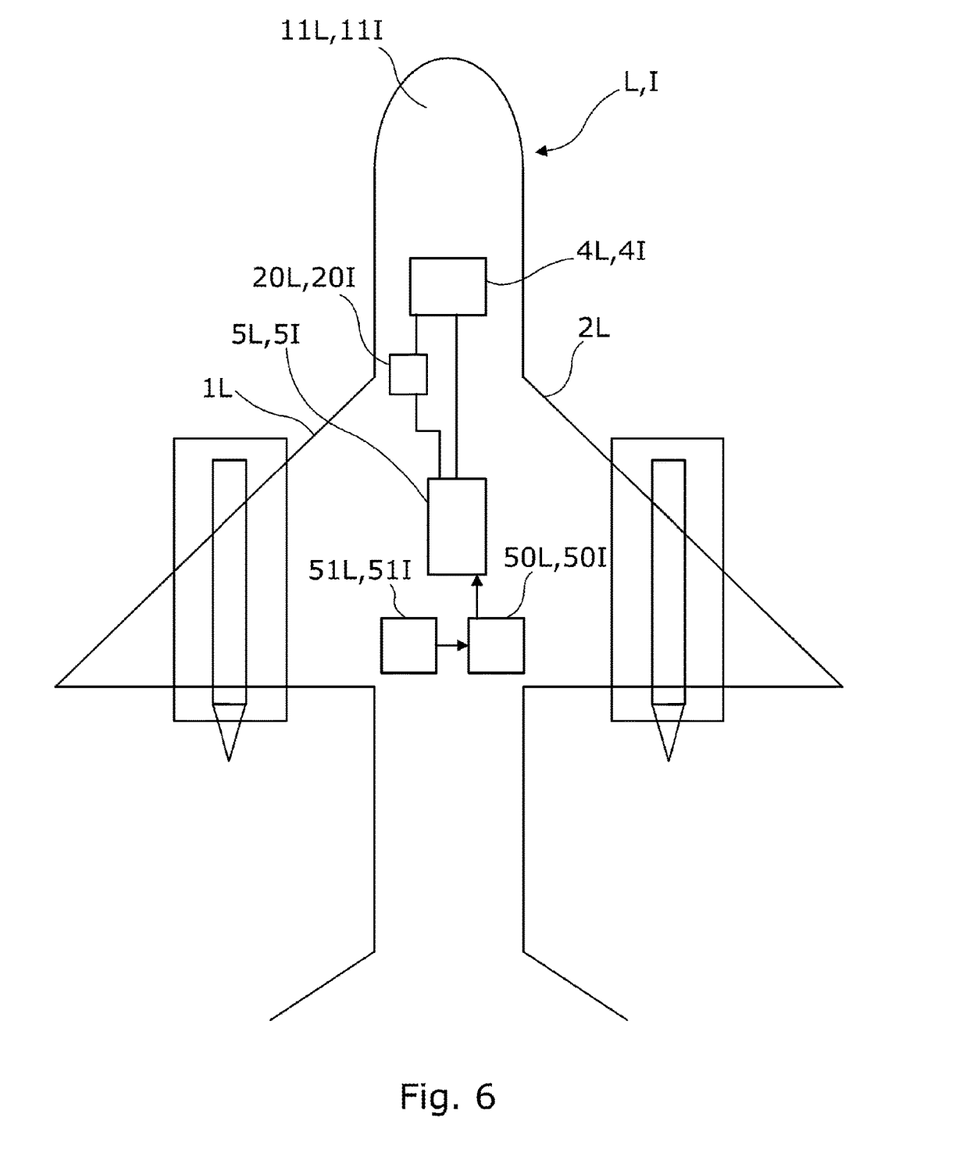
FIG. 6 is a view similar to FIG. 1, in which the aircraft furthermore comprises an ADS-B system.

As a variant, and with reference to FIG. 6, the lead aircraft L and the intruder aircraft I are each equipped with an automated air traffic control system 50L, 50I of ADS-B (Automatic Dependent Surveillance-Broadcast) type connected to the collision avoidance system and to a satellite positioning system 51L, 51I (not shown in the figures). The messages from the automated air traffic control system 50L, 50I, transmitted periodically (for example every second) and exchanged between an intruder aircraft I and a lead aircraft L, via the transponders 8L, 8I of the aircraft, contain coordinates (provided by the satellite positioning system) in the terrestrial geographical reference frame.

Figure 7:
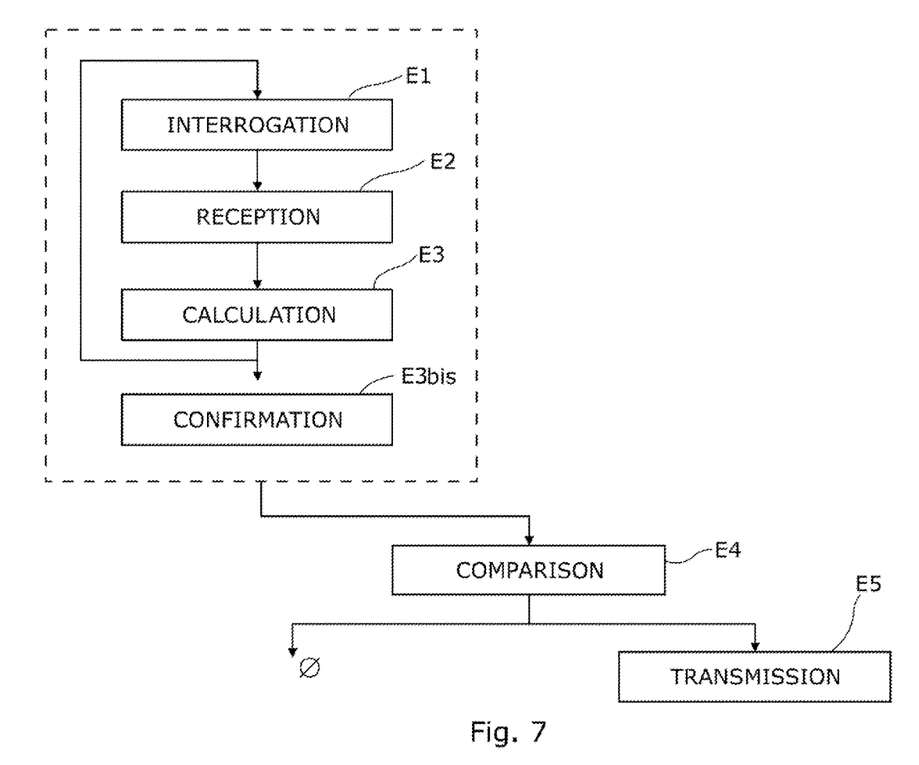
FIG. 7 is a schematic view of the steps of a flight parameter transmission method according to the disclosure herein between a lead aircraft and an intruder aircraft each comprising an ADS-B system.

Considering this variant, and with reference to FIG. 7, the method such as described above is supplemented by a confirmation step E3bis, following the calculation step E3. During the confirmation step E3bis, the position of the intruder aircraft I determined in the calculation step E3 is compared with the position of the intruder aircraft I given by reading the last message from the automated air traffic control system transmitted by the intruder aircraft I. If the positions match, to within a margin of error, the comparison step E4 is implemented, otherwise, if the difference between the two positions is too great (greater than 15%), the comparison step E4 is not implemented.

This variant is advantageous in that it makes it possible to check that the response signal from the intruder aircraft I, received in the reception step E2, has not been hijacked by an individual wishing to know flight parameters of the lead aircraft L.

In one variant, in order that the flight parameters (other than the altitude) of the lead aircraft are available only to an intruder plane I flying within the volume of confidence C, the wave of the enriched signal is transmitted (in the transmission step E5), by the transponder 8L of the lead aircraft, at a restricted power, such that the wave is not able to propagate beyond a distance greater than a distance that the lead aircraft has determined in the calculation step E3, to within a margin of error, so as to take account of unfavourable wave propagation conditions.

This variant is advantageous in that it makes it possible to check that the flight parameters (other than the altitude) transmitted to the intruder aircraft are not able to be intercepted by an individual wishing to know these flight parameters of the lead aircraft.

According to the disclosure herein, the enriched signal may comprise only one flight parameter, which in this case is the mass of the lead aircraft. Specifically, this is the only flight parameter that is not able to be estimated and that it is necessary to know in order for the flight management system to calculate the descent speed of the centers of the vortices. The other flight parameters, such as the speed and the altitude of the lead aircraft, are for their part known/deduced from conventional data communication between the collision avoidance systems of TCAS type. Thus, in particular, the transponder 8L of a lead aircraft L located within the monitoring volume of the intruder aircraft and interrogated by the intruder aircraft I transmits, via its transponder antenna 9L, a response signal to the interrogator 6I of the intruder aircraft, the response signal comprising the altitude of the lead aircraft L.

In addition to calculating the positions of the centers of the wake vortices (14L, 15L) generated by the lead aircraft L, the flight management system 4I of an intruder aircraft, receiving the flight parameters of the lead aircraft L, may be configured to calculate other features of the wake vortices generated by a lead aircraft. The flight management system 4I of the intruder aircraft may thus also be configured to calculate the flow strength Γ of the wake vortices generated by the lead aircraft so as to position itself effectively, when it is flying in formation behind the lead aircraft, in the updraughts of the vortices.

The flow strength Γ is for example calculated using the following relationship:

$$\Gamma = \frac{m \cdot g \cdot n_z}{\rho \cdot V \cdot b_v}$$

where
m the mass of the aircraft generating the vortices (kg)
g the acceleration due to gravity (9.81 m/s$^2$)
ρ the air density at the flight point (kg·m−3)
V the speed of the aircraft generating the vortices (m·s−1)

by the spacing between the 2 vortices (m)=size of the aircraft generating the vortices nz the load factor to which the aircraft is subjected (g).

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for transmitting flight parameters of a lead aircraft to at least one intruder aircraft, enabling the intruder aircraft to calculate positions of centers of wake vortices generated by the lead aircraft or to calculate flow strength of the wake vortices, each aircraft comprising:
    a collision avoidance system configured to detect probabilities of collisions with other aircraft flying within a monitoring volume distributed around the aircraft, the system comprising an interrogator connected to a directional antenna, termed interrogator antenna, and a transponder;
    a flight management system collecting the flight parameters of the aircraft; and
    a flight parameter transmission authorization system connected to the collision avoidance system, the flight parameter transmission authorization system having a database comprising coordinates defining a volume of confidence, the volume of confidence being smaller than the monitoring volume of the aircraft;
    the method comprising successive steps comprising:
    interrogation, in which the interrogator of the lead aircraft transmits an interrogation signal via the interrogator antenna in each of four segments of 90° azimuth, the interrogation signal containing an address of the lead aircraft;
    reception, in which the interrogator of the lead aircraft receives, from the transponder of each intruder aircraft located within the monitoring volume, a response signal in response to an interrogation signal from the lead aircraft, the response signal comprising an altitude of the intruder aircraft provided by the flight management system of the intruder aircraft;
    calculation, in which the interrogator of the lead aircraft determines position of each intruder aircraft on a basis of time difference between transmission of the interrogation signal and reception of a response signal from the intruder aircraft, of an analysis of a wave carrying the intruder response signal, and of knowledge of the altitude of the intruder aircraft;
    comparison, and determination, on a basis of the database, of position of each intruder aircraft with respect to the volume of confidence; and
    only if an intruder aircraft is situated within the volume of confidence, transmission, by the flight parameter transmission authorization system of the lead aircraft, of an instruction to the transponder of the lead aircraft to transmit an enriched signal to the interrogator of the intruder aircraft, the enriched signal comprising one or more flight parameters provided by the flight management system of the lead aircraft and enabling the flight management system of the intruder aircraft to calculate the position of centers of wake vortices generated by the lead aircraft or the flow strength of the wake vortices.

2. The method according to claim 1, wherein a flight parameter of the lead aircraft is an item of data taken from among items of data comprising: mass of the lead aircraft, roll angle of the lead aircraft, aerodynamic configuration of the lead aircraft, size of the lead aircraft, air density at the flight point of the lead aircraft, speed of the lead aircraft.

3. The method according to claim 1, the lead aircraft and the intruder aircraft each being equipped with an automated air traffic control system, the automated air traffic control system of the intruder aircraft periodically sending, to the automated air traffic control system of the lead aircraft, messages containing coordinates of the intruder aircraft,
    wherein, following the calculation step, the flight parameter transmission authorization system of the lead aircraft, in a confirmation step, compares the position of the intruder aircraft determined in the calculation step with the position of the intruder aircraft given by reading the last message transmitted by the intruder aircraft, and
    wherein if a difference between the two positions is greater than a predetermined value, the comparison step is not implemented.

4. An aircraft comprising:
    a collision avoidance system comprising an interrogator connected to a directional antenna, termed interrogator antenna, and a transponder, the collision avoidance system being configured to detect probabilities of collisions with other aircraft, termed intruder aircraft, flying within a monitoring volume distributed around the aircraft;
    a flight management system collecting flight parameters of the aircraft;
    a flight parameter transmission authorization system connected to the collision avoidance system, the flight parameter transmission authorization system having a database comprising coordinates defining a volume of confidence, the volume of confidence being smaller than the monitoring volume, and wherein the flight management system is configured to calculate position of centers of wake vortices generated by an intruder aircraft on a basis of flight parameters of the intruder aircraft or to calculate flow strength of the wake vortices generated by the intruder aircraft.

* * * * *